(12) United States Patent
Kishan et al.

(10) Patent No.: US 9,489,236 B2
(45) Date of Patent: Nov. 8, 2016

(54) APPLICATION PRIORITIZATION

(71) Applicant: MICROSOFT TECHNOLOGY LICENSING, LLC, Redmond, WA (US)

(72) Inventors: Arun U. Kishan, Kirkland, WA (US); Hari Pulapaka, Redmond, WA (US); James Anthony Schwartz, Jr., Seattle, WA (US); Alex Bendetov, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 274 days.

(21) Appl. No.: 13/664,954

(22) Filed: Oct. 31, 2012

(65) Prior Publication Data

US 2014/0123151 A1    May 1, 2014

(51) Int. Cl.
G06F 9/46    (2006.01)
G06F 9/48    (2006.01)

(52) U.S. Cl.
CPC .................................. *G06F 9/4881* (2013.01)

(58) Field of Classification Search
CPC ..................................................... G06F 9/4881
USPC ........................................................ 718/103
See application file for complete search history.

(56) References Cited

U.S. PATENT DOCUMENTS

| | | | |
|---|---|---|---|
| 6,260,150 B1 | 7/2001 | Diepstraten et al. | |
| 6,834,386 B1 | 12/2004 | Douceur et al. | |
| 7,051,098 B2 | 5/2006 | Masters et al. | |
| 7,313,688 B2 | 12/2007 | Bishop, Jr. et al. | |
| 7,334,228 B2* | 2/2008 | Clohessy et al. | ............. 718/104 |
| 7,380,218 B2 | 5/2008 | Rundell | |
| 7,421,509 B2 | 9/2008 | Lolayekar et al. | |
| 7,440,751 B2 | 10/2008 | Boros | |

(Continued)

FOREIGN PATENT DOCUMENTS

| | | |
|---|---|---|
| CN | 1233015 A | 10/1999 |
| CN | 1510579 A | 6/2006 |

OTHER PUBLICATIONS

Int. Search Report cited in PCT Application No. PCT/US2011/055618 dated Sep. 28, 2012, 9 pgs.

(Continued)

*Primary Examiner* — Camquy Truong
(74) *Attorney, Agent, or Firm* — John Jardine; Raghu Chinagudabha; Micky Minhas

(57) ABSTRACT

Among other things, one or more techniques and/or systems are provided for application prioritization. For example, an operating system of a computing device may contemporaneously host one or more applications, which may compete for computing resources, such as CPU cycles, I/O operations, memory access, and/or network bandwidth. Accordingly, an application (e.g., a background task or service) may be placed within a de-prioritized operating mode during launch and/or during execution, which may result in the application receiving a relatively lower priority when competing with applications placed within a standard operating mode for access to computing resources. In this way, an application placed within a standard operating mode (e.g., a foreground application currently interacted with by a user) may have priority to computing resources over the de-prioritized application, such that the application within the standard operating mode may provide enhanced performance based upon having priority to computing resources.

20 Claims, 8 Drawing Sheets

(56) References Cited

U.S. PATENT DOCUMENTS

| | | | |
|---|---|---|---|
| 7,640,547 | B2 | 12/2009 | Neiman et al. |
| 7,647,591 | B1 | 1/2010 | Loucks |
| 7,716,672 | B2 | 5/2010 | Douceur et al. |
| 7,720,098 | B1 | 5/2010 | Allen et al. |
| 7,765,553 | B2 | 7/2010 | Douceur et al. |
| 7,774,781 | B2 | 8/2010 | Dees et al. |
| 7,787,489 | B2 | 8/2010 | Caulfield et al. |
| 7,885,222 | B2 | 2/2011 | Cole |
| 7,904,673 | B2 | 3/2011 | Riska et al. |
| 7,945,914 | B2 | 5/2011 | Hasiuk et al. |
| 7,962,911 | B2 | 6/2011 | Cheng et al. |
| 7,970,902 | B2 | 6/2011 | Rolia et al. |
| 8,028,060 | B1 | 9/2011 | Wyld et al. |
| 8,145,785 | B1 | 3/2012 | Finkelstein et al. |
| 8,183,994 | B2 | 5/2012 | Staab |
| 8,223,655 | B2 | 7/2012 | Heinz et al. |
| 8,296,410 | B1 | 10/2012 | Myhill et al. |
| 8,316,098 | B2 | 11/2012 | Luna et al. |
| 8,352,611 | B2 | 1/2013 | Maddhuri et al. |
| 8,468,246 | B2 | 6/2013 | Mays et al. |
| 8,533,403 | B1 | 9/2013 | Law |
| 8,645,750 | B2 | 2/2014 | Kaneko et al. |
| 8,661,447 | B1 | 2/2014 | Olliff et al. |
| 8,806,486 | B2 | 8/2014 | Martin et al. |
| 8,869,154 | B1 | 10/2014 | Hillyard et al. |
| 8,887,166 | B2 | 11/2014 | Gerovac et al. |
| 8,914,511 | B1 | 12/2014 | Yemini et al. |
| 2002/0111962 | A1 | 8/2002 | Crucs |
| 2003/0061260 | A1 | 3/2003 | Rajkumar |
| 2003/0084087 | A1 | 5/2003 | Berry |
| 2004/0054770 | A1 | 3/2004 | Touboul |
| 2005/0026654 | A1 | 2/2005 | Perez et al. |
| 2005/0177832 | A1* | 8/2005 | Chew .................. G06F 9/44594 718/104 |
| 2006/0106928 | A1 | 5/2006 | Westendorf et al. |
| 2006/0130067 | A1 | 6/2006 | Grabarnik et al. |
| 2006/0174246 | A1 | 8/2006 | Tamura et al. |
| 2006/0277391 | A1 | 12/2006 | Bittner, Jr. |
| 2007/0004468 | A1 | 1/2007 | Boros |
| 2007/0006202 | A1 | 1/2007 | Mikkelsen et al. |
| 2007/0101279 | A1 | 5/2007 | Chaudhri et al. |
| 2007/0248036 | A1 | 10/2007 | Nevalainen |
| 2007/0255798 | A1 | 11/2007 | Schneider |
| 2008/0049714 | A1 | 2/2008 | Commarford et al. |
| 2008/0160958 | A1 | 7/2008 | Abichandani et al. |
| 2008/0189708 | A1 | 8/2008 | Cheng et al. |
| 2008/0310639 | A1 | 12/2008 | Kanda et al. |
| 2008/0313639 | A1 | 12/2008 | Kumar et al. |
| 2009/0037430 | A1 | 2/2009 | Mukkamala et al. |
| 2009/0182608 | A1 | 7/2009 | Tran et al. |
| 2009/0317796 | A1 | 12/2009 | Lin et al. |
| 2010/0042400 | A1 | 2/2010 | Block et al. |
| 2010/0112955 | A1 | 5/2010 | Krishnaswamy et al. |
| 2010/0115193 | A1 | 5/2010 | Manus et al. |
| 2010/0115525 | A1 | 5/2010 | Loucks |
| 2010/0185396 | A1 | 7/2010 | Docherty |
| 2010/0185758 | A1 | 7/2010 | Hoga et al. |
| 2010/0199063 | A1 | 8/2010 | Sechrest et al. |
| 2010/0302002 | A1 | 12/2010 | Guo et al. |
| 2010/0312776 | A1* | 12/2010 | Burrichter et al. ........... 707/759 |
| 2011/0239156 | A1 | 9/2011 | Lin |
| 2011/0296418 | A1 | 12/2011 | Kim et al. |
| 2012/0054752 | A1 | 3/2012 | Chin |
| 2012/0079016 | A1 | 3/2012 | Hung et al. |
| 2012/0096287 | A1 | 4/2012 | Kamath et al. |
| 2012/0185532 | A1 | 7/2012 | Kristiansson et al. |
| 2012/0260118 | A1 | 10/2012 | Jiang et al. |
| 2012/0324467 | A1* | 12/2012 | Limoratto et al. ............ 718/104 |
| 2013/0024812 | A1 | 1/2013 | Reeves et al. |
| 2013/0067438 | A1 | 3/2013 | Bates |
| 2013/0067494 | A1 | 3/2013 | Srour et al. |
| 2013/0086365 | A1 | 4/2013 | Gschwind et al. |
| 2013/0110773 | A1 | 5/2013 | Burger et al. |
| 2014/0047333 | A1 | 2/2014 | Braun et al. |

OTHER PUBLICATIONS

Int. Search Report cited in PCT Application No. PCT/US2011/055630 dated Sep. 27, 2012, 9 pgs.
Software Design that gets the most out of new AMD Multi-core Microprocessors, Greg Fry, Aug. 21, 2008. reprinted from the Internet eveloper.amd.com/documentation/articles/pages/getthennostoutofnewanndmulti-coremicroprocessors.aspx., 4 pgs.
"Background Applications", Jun. 17, 2011, reprinted from the Internet at: read.pudn.com/downloads100/ebook/410482/brew__background__apps.pdf, 2 pgs.
"Compute Cycles", Sep. 19, 2011, reprinted from the Internet at: blog.cyclecomputing.com/condor/, 32 pgs.
"Scheduling", Oct. 24, 2011, reprinted from the Internet at: soolly.springnote.com/pages/2222862/xhtml, 11 pgs.
"Multimedia Class Scheduler Service", Oct. 24, 2011, reprinted from the Internet at: http://msdn.microsoft.com/en-us/library/windows/desktop/ms684247(v=vs.83).aspx, 3 pgs.
"Resource Reservation and Power Management in Android", Martin Olsson and Samuel Skanberg, Mar. 2011, reprinted from the Internet at: control.lth.se/documents/2011/5875.pdf, 168 pgs.
"Introduction to Background Tasks", Sep. 13, 2011, reprinted from the Internet at: http://go.microsoft.com/fwlink/?LinkID=227329 &ckcud-0x409, 16 pgs.
Reply Non-Final Office Action cited in U.S. Appl. No. 13/224,154 dated Jan. 3, 2014, 15 pgs.
Reply Non-Final Office Action cited in U.S. Appl. No. 13/224,168 dated Sep. 24, 2013, 22 pgs.
Final Office Action cited in U.S. Appl. No. 13/224,168 dated Dec. 27, 2013, 34 pgs.
Restriction/Election Office Action cited in U.S. Appl. No. 13/224,154 dated Apr. 2, 2013, 8 pgs.
Reply Restriction/Election Office Action cited in U.S. Appl. No. 13/224,154 dated Apr. 23, 2013, 8 pgs.
Non-Final Office Action cited in U.S. Appl. No. 13/224,154 dated Jul. 3, 2013, 14 pgs.
Non-Final Office Action cited in U.S. Appl. No. 13/224,168 dated Apr. 25, 2013, 45 pgs.
"Description of Performance Options in Windows", Retrieved at <<support.microsoft.com/kb/259025>>, Retrieved Date: Jul. 17, 2012, p. 1.
Likness, Jeremy, "Process Lifetime Management (PLM) and Managing State in Windows 8 Metro C# Applications", Retrieved at <wintellect.com/cs/blogs/jlikness/archive/2012/06/27/process-life-time-management-plm-and-managing-state-in-windows-8-metro-c-applications.aspx>>, Jun. 27, 2012, pp. 8.
Sinofsky, Steven, "Improving power efficiency for applications", Retrieved at <logs.msdn.com/b/b8/archive/2012/02/07/improving-power-efficiency-for-applications.aspx>>, Feb. 7, 2012, pp. 49.
Final Office Action cited in U.S. Appl. No. 13/224,154 dated Apr. 16, 2014, 14 pgs.
Reply Final Office Action cited in U.S. Appl. No. 13/224,168 dated Jun. 27, 2014, 20 pgs.
Chinese Office Action cited in Chinese Application No. 201210317453.8 dated Apr. 24, 2014, 3 pgs.
Non-Final Office Action cited in U.S. Appl. No. 13/355,115 dated Jan. 9, 2015, 14 pgs.
Reply Final Office Action cited in U.S. Appl. No. 13/334,154 dated Oct. 9, 2014, 9 pgs.
Notice of Allowance cited in U.S. Appl. No. 13/224,154 dated Oct. 24, 2014, 18 pgs.
Notice of Allowance cited in U.S. Appl. No. 13/224,168 dated Jan. 9, 2015, 25 pgs.
Non-Final Office Action cited in U.S. Appl. No. 13/664,954 dated Nov. 20, 2014, 14 pgs.
Reply Chinese Office Action cited in Chinese Application No. 201210317453.8 dated Sep. 17, 2014, 3 pgs.
Second Chinese Office Action cited in Chinese Application No. 201210317453.8 dated Dec. 31, 2014, 3 pgs.
Chinese Office Action cited in Chinese Application No. 201210320583.7 dated Oct. 27, 2014, 5 pgs.
Notice of Allowance cited in U.S. Appl. No. 13/224,154 dated Feb. 13, 2015, 21 pgs.

(56) References Cited

OTHER PUBLICATIONS

Corrected Notice of Allowability cited in U.S. Appl. No. 13/224,168 dated Mar. 6, 2015, 8 pgs.

Reply second Chinese Office Action cited in Chinese Application No. 201210317453.8 dated Feb. 23, 2015, 2 pgs.
Reply first Chinese Office Action cited in Chinese Application No. 201210320583.7 dated Mar. 11, 2015, 4 pgs.

\* cited by examiner

APPLICATION PRIORITIZATION

BACKGROUND

An operating system of a computing device, such as a desktop device, a mobile device, a tablet device, etc., may host one or more applications. For example, an operating system of a touch screen device may provide the user with access to a web browser, a text messaging service, an email application, a social network application, and/or a variety of other applications. Because multiple applications may be concurrently hosted by the operating system, such applications may compete for computing resources, such as CPU cycles, memory access, I/O operation, network bandwidth, etc. For example, while a user is interacting with a web browser of the touch device, a text messaging service may launch in response to an incoming text message. Launching and/or executing the text messaging service may consume computing resources that may otherwise be used by the web browser to provide the user with a robust web browsing experience. For example, the web browser may provide a suboptimal video playback experience because the web browser may not have access to adequate computing resources for displaying a video to the user when the user is concurrently presented with a text message from the text messaging service.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

Among other things, one or more systems and/or techniques for application prioritization are provided herein. That is, an operating system may be configured to host applications within a standard operating mode and/or a de-prioritized operating mode. The standard operating mode may allow applications to compete for computing resources, such as CPU cycles, I/O operations, and/or memory, according to a standard priority. In contrast, the de-prioritized operating mode may allow applications to compete for computing resources with a relatively lower priority. For example, a thread of a text messaging application operating in the de-prioritized operating mode may be scheduled, by a CPU scheduler, only after applications operating in the standard operating mode. In this way, computing resource consumption by applications operating in the de-prioritized operating mode (e.g., a background task, a service, a background application, etc.) may be controlled so that such de-prioritized applications do not hold-up and/or over consume computing resources that may be otherwise used by other applications (e.g., a foreground application currently being used by a user).

In one example of application prioritization, an application may be identified for placement within the de-prioritized operating mode. For example, while a user is interacting with a web browser, a text messaging service may attempt to launch in order to process an incoming text message in the background. The text messaging service may be identified for placement within the de-prioritized operating mode because the text messaging service may provide background task functionality. It may be appreciated that an application may be identified for placement within the de-prioritized operating mode based upon various factors, such as whether the application is to execute in a background state, whether the application is a service, whether the user is presently interacting with a different application, whether the application is visible to the user, a predefined priority for the application, etc.

The de-prioritized operating mode may comprise various operating constraints (e.g., restrictions) for the application. In one example, the de-prioritized operating mode may comprise a CPU scheduling de-prioritization for a thread of the application, such that the thread may receive a relatively lower priority than other threads managed by a CPU scheduler. In another example, the de-prioritized operating mode may comprise an I/O access de-prioritization for one or more I/O operations by the application, such that I/O operations of the application may be processed after I/O operations of applications operating within the standard operating mode. In another example, the de-prioritized operating mode may comprise a memory access de-prioritization for memory page access by the application. In another example, the de-prioritized operating mode may comprise a GPU scheduling de-prioritization, which may have increasing importance or impact as larger workloads are scheduled with or applied to the GPU, for example. It may be appreciated that the de-prioritized operating mode may comprise other operating constraints, such as network bandwidth constraints, system resource constraints, etc.

Once the application is identified for placement within the de-prioritized operating mode, the application may be launched and/or executed within the de-prioritized operating mode. In one example where the application has not yet launched (e.g., DLLs and/or other binaries associated with the application have not yet been loaded and/or initialized), the application may be launched within the de-prioritized operating mode. Because the application may become "resource starved" due to de-prioritization of resource consumption enforced upon the application during the de-prioritization operating mode (e.g., text messaging service may be unable to make forward progress with launch because the text messaging service may not have a chance to access computing resources due to other applications, with relatively higher priorities, consuming such resources), progress of the application launch may be monitored. If the progress of the application launch is below a launch progress threshold, then one or more restrictions placed upon the application by the de-prioritized operating mode may be reduced (e.g., temporality removed, a priority may be increased, etc.). Reducing restrictions may facilitate completion of the launch phase so that system resources (e.g., critical system resources) that cannot be relinquished until the launch is completed are relinquished in a timely fashion.

In another example where the application has launched, the application may be executed within the de-prioritized operating mode. Because the application may experience resource starvation, the execution of the application may be monitored to determine whether the application is executing below a service level that is to be provided for the application. If the application is executing below the service level, then one or more restrictions placed upon the application by the de-prioritized operating mode may be reduced (e.g., temporality removed, a priority may be increased, etc.). Because the application may consume computing resources without making forward task progress (e.g., text messaging service may continue polling a messaging server that is unavailable), the execution of the application may be monitored to determine whether the application is in an idle state (e.g., making relatively little task progress, which may be identified based upon relatively low resource utilization, for example). That is, the application may be identified as being in an idle state when the application is not making significant task completion progress (e.g. the application may be wasting memory resources and/or may be preventing the device from entering a lower power state without making significant task completion progress due to inactivity (e.g., as identified by relatively low resource utilization) of the application). In one example, if the application is not making signification task completion progress, then resource utilization quotas may be imposed upon the application, which may allow the application to be de-scheduled (e.g., cancelled) once a sufficient amount of resources have been consumed. In another example, if the application is in the idle state (e.g., for a predefined period of time), then the application may be cancelled. In this way, the application may be launched and/or executed within the de-prioritized operating mode so that the application does not hold-up and/or over consume computing resources that may be used by other applications (e.g., with relatively higher priorities, such as a system service and/or a foreground application being interacted with by the user).

In another example of prioritizing applications, quotas may be defined for resource consumption. For example, a quota associated with consumption of a resource by an application may be defined (e.g., a limit on CPU usage, I/O usage, network usage, GPU usage, etc.). Resource consumption by the application may be throttled and/or paused based upon the quota (e.g., once a particular percentage of the quota has been used, the resource consumption by the application may be throttled down). In one example, the quota may be set based upon a priority of the application (e.g., an application in the de-prioritized operating mode may be assigned a relatively low quota). In this way, aggregate resource usage may be controlled in light of application priorities.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
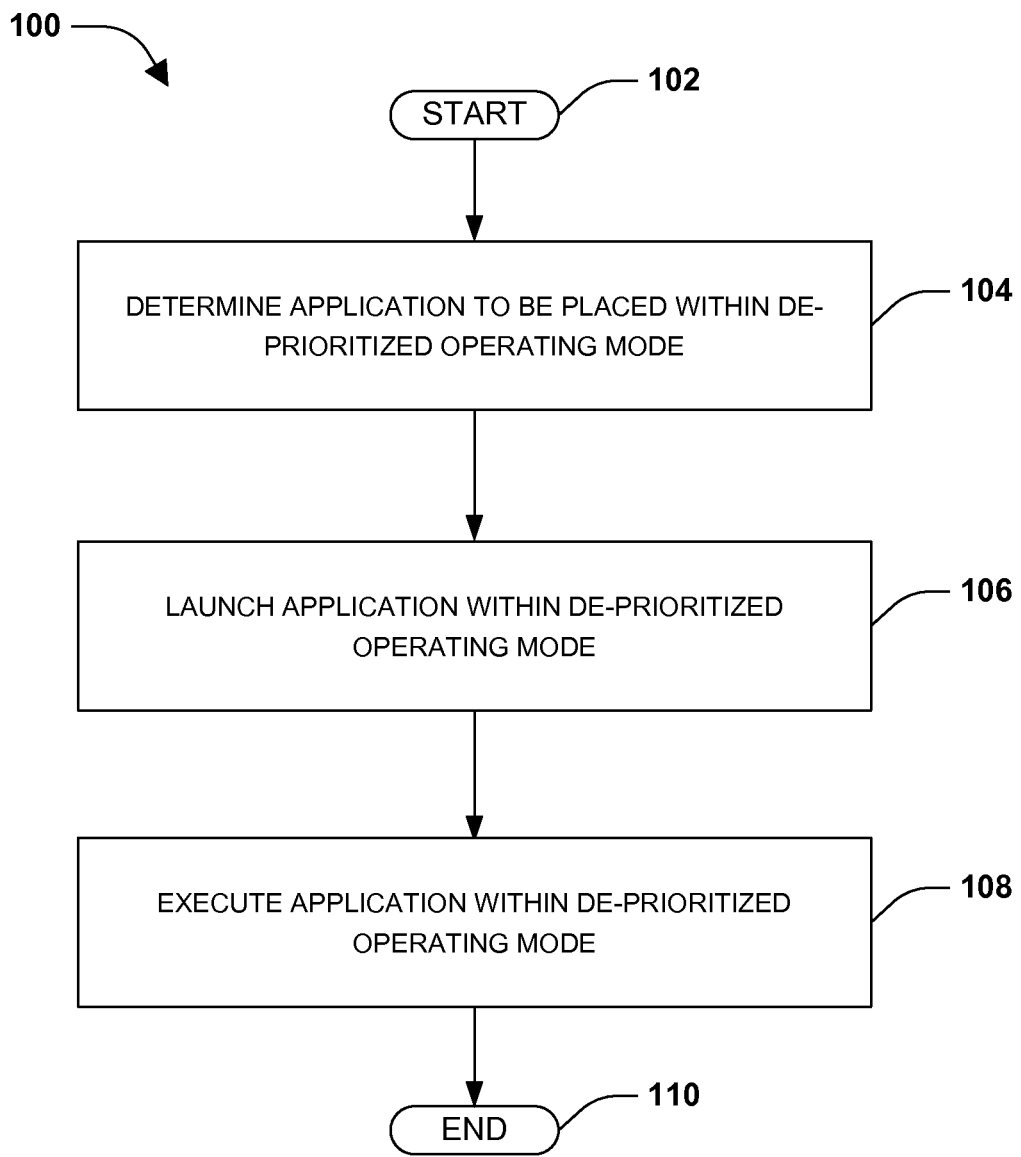
FIG. 1 is a flow diagram illustrating an exemplary method of application prioritization.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. In other instances, structures and devices are illustrated in block diagram form in order to facilitate describing the claimed subject matter.

An operating system of a computing device (e.g., a touch device, a mobile device, a desktop device, an integrated device for a household appliance, etc.) may host one or more applications that provide various functionality. Because the operating system may host one or more applications contemporaneously, such applications may share and/or compete for computing resources. Applications may have various priorities to a user and/or the operating system at different times. In one example, an application that the user is currently interacting with may have a relatively higher priority to the user than a background service. In another example, a system service may have a relatively higher priority to the operating system than a background application. Accordingly, as provided herein, access to computing resources, such as CPU cycles, network bandwidth, memory access, GPU access prioritization, etc., may be controlled for applications executing within a de-prioritized operating mode. In this way, applications executing within a standard operating mode may be afforded relatively higher priority to such computing resources than the de-prioritized application, which may provide the user with a robust experience and/or improve operability of the operating system, for example.

One embodiment of application prioritization is illustrated by an exemplary method 100 in FIG. 1. At 102, the method starts. At 104, an application that is to be placed within a de-prioritized operating mode may be identified. For example, the application may be identified as a background task, an application that is not in a foreground state, a service, a low priority application, etc. The application may be placed within the de-prioritized operating mode during launch and/or during execution.

The de-prioritized operating mode may place various constraints (e.g., restrictions) upon the application. In one example, the de-prioritized operating mode may comprise a CPU scheduling de-prioritization that assigns a relatively low priority to a thread of the application (e.g., compared with relatively higher priorities assigned to threads of system services and/or applications placed within a standard operating mode). A CPU scheduler may schedule the thread after other threads having relatively higher priorities. In this way, the thread may not utilize (e.g., hold-up and/or over consume) CPU cycles that may otherwise be used by threads of applications with relatively higher priorities (e.g., a web browser, currently used by a user, may have priority access to the CPU in comparison with the de-prioritized application, such that web browser may provide enhanced browsing performance for the user based upon the prioritized CPU access). In another example, the de-prioritized operating mode may comprise an I/O access de-prioritization for one or more I/O operations by the application. In this way, I/O operations performed by applications operating within the standard operating mode may have priority over I/O operations of the de-prioritized application. In another example, the de-prioritized operating mode may comprise a memory access de-prioritization for memory page access by the application. In this way, memory access operations by applications operating within the standard operating mode may have priority over memory access operations of the de-prioritized application. It may be appreciated that the de-prioritized operating mode may comprise other constraints, such as network bandwidth constraints and/or operating system resource constraints, for example, and is not limited to the examples provided herein.

At 106, the application may be launched (e.g., DLLs and/or other code, such as binaries, associated with the application may be loaded and/or initialized) within the de-prioritized operating mode. Because the application launch may not make appropriate forward progress towards launch completion due to the application having relatively lower priority access to computing resources, progress of the application may be monitored. That is, the application may need system resources during an initial bootstrap of the launch that cannot be released until the initial bootstrap has been completed, and thus it may be advantageous to facilitate completion of the initial bootstrap so that such system resources are relinquished (e.g., freed up for use by other applications). For example, I/O activity, memory access by the application, CPU scheduling information (e.g., provided by a kernel), and/or a variety of other information may be monitored to determined whether the progress of the application launch is below a launch progress threshold (e.g., the application has not launched within an expected launch time, the application has not been provided adequate access to computing resources to make forward progress with launch, etc.). Responsive to the progress of the application launch being below a launch progress threshold, one or more restrictions (e.g., constraints on memory access, I/O operation access, CPU access, network bandwidth, etc.) placed on the application by the de-prioritized operating mode may be reduced (e.g., a constraint may be temporarily removed, a priority may be increased, etc.). In this way, the application may have access to computing resources (e.g., the application may compete, at a similar priority, with other applications for access to computing resources). Responsive to the progress of the application launch not being below the launch progress threshold (e.g., the application completes launch and/or starts to execute), the one or more restrictions may be restored (e.g., the application may execute within the de-prioritized operating mode).

At 108, the application may be executed within the de-prioritized operating mode. The application execution of the application may be monitored (e.g., based upon a watchdog timer functionality) to determine whether the application is idle (e.g., the application may be identified as not making significant task completion progress based upon relatively low resource utilization) or is resource starved (e.g., unable to make forward task progress based upon one or more restrictions placed upon the application by the de-prioritized operating mode). In one example, responsive to a determination that the application execution of the application is below a service level provided for the application, one or more restrictions placed upon the application by the de-prioritized operating mode may be reduced. In this way, the application may contend for computing resources at a priority that may be similar to priorities of applications placed within a standard operating mode, which may allow the application to access computing resources for making forward task progress. In another example, responsive to determining that the application execution of the application is below an idle threshold (e.g., a determination that the application is consuming resources below an idle resource threshold while in an idle state, a determination that a device, hosting the application, can at least one of enter a lower power state, or free up memory, etc. if the application is cancelled, etc.), the application may be cancelled to free-up computing resources (e.g., a text messaging service that continuously polls a message server that is not currently online may be cancelled). During execution, the application may be transitioned between the de-prioritized operating mode and the standard operating mode. For example, the application may be transitioned from the de-prioritized operating mode into the standard operating mode based upon the application being brought into a foreground state. It may be appreciated that other various triggers may be used to transition the application between modes. At 110, the method ends.

Figure 2:
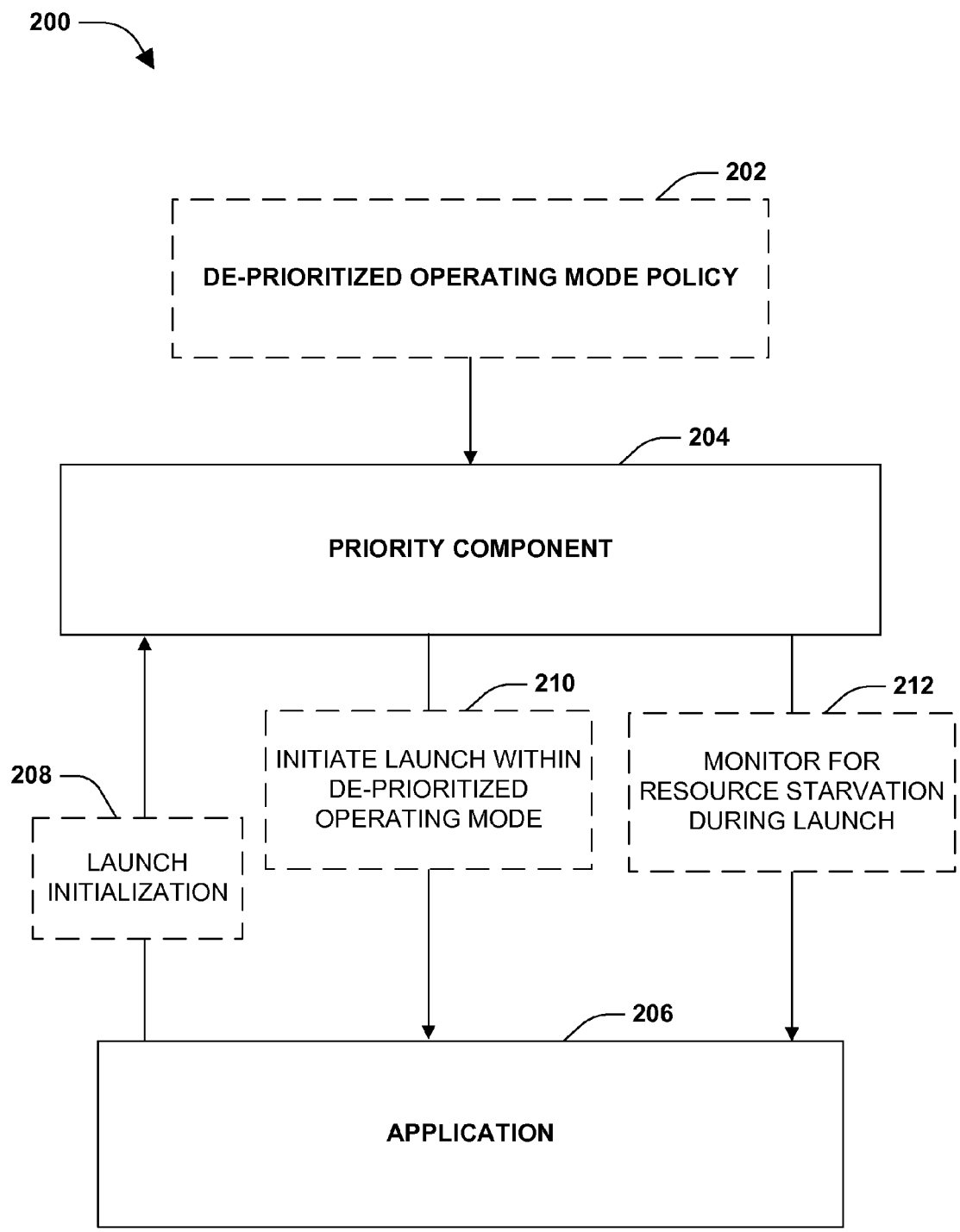
FIG. 2 is a component block diagram illustrating an exemplary system for placing an application into a de-prioritized operating mode during launch.

FIG. 2 illustrates an example of a system 200 configured for placing an application into a de-prioritized operating mode during launch. The system 200 may comprise a priority component 204. The priority component 204 may be configured to place one or more applications, such as application 206, into the de-prioritized operating mode during launch. The de-prioritized operating mode may control access to computing resources by the application 206 based upon a de-prioritized operating mode policy 202. For example, the de-prioritized operating mode policy 202 may comprise CPU scheduling de-prioritization, an I/O access de-prioritization, a memory access de-prioritization, and/or other restrictions/constraints (e.g., network bandwidth constraints, operating system resource constraints, etc.).

In one example, responsive to a launch initialization 208 of the application 206, the priority component 204 may place the application 206 into the de-prioritized operating mode during launch (e.g., initiate launch 210). In this way, the application 206 may access computing resources based upon the de-prioritized operating mode policy 202. During launch, the priority component 204 may be configured to monitor 212 the application 206 for resource starvation. For example, the priority component 204 may reduce one or more restrictions placed upon the application by the de-prioritized operating mode policy 202 based upon progress of the application launch being below a launch progress threshold (e.g., the application 206 is unable to make adequate forward progress towards launch because the application 206 has a relatively low priority to compete for access to computing resources). In this way, the application 206 may compete for resources using a new priority (e.g., a temporarily assigned priority) that may be relatively similar to priorities of applications operating in a standard operating mode, for example.

Figure 3:
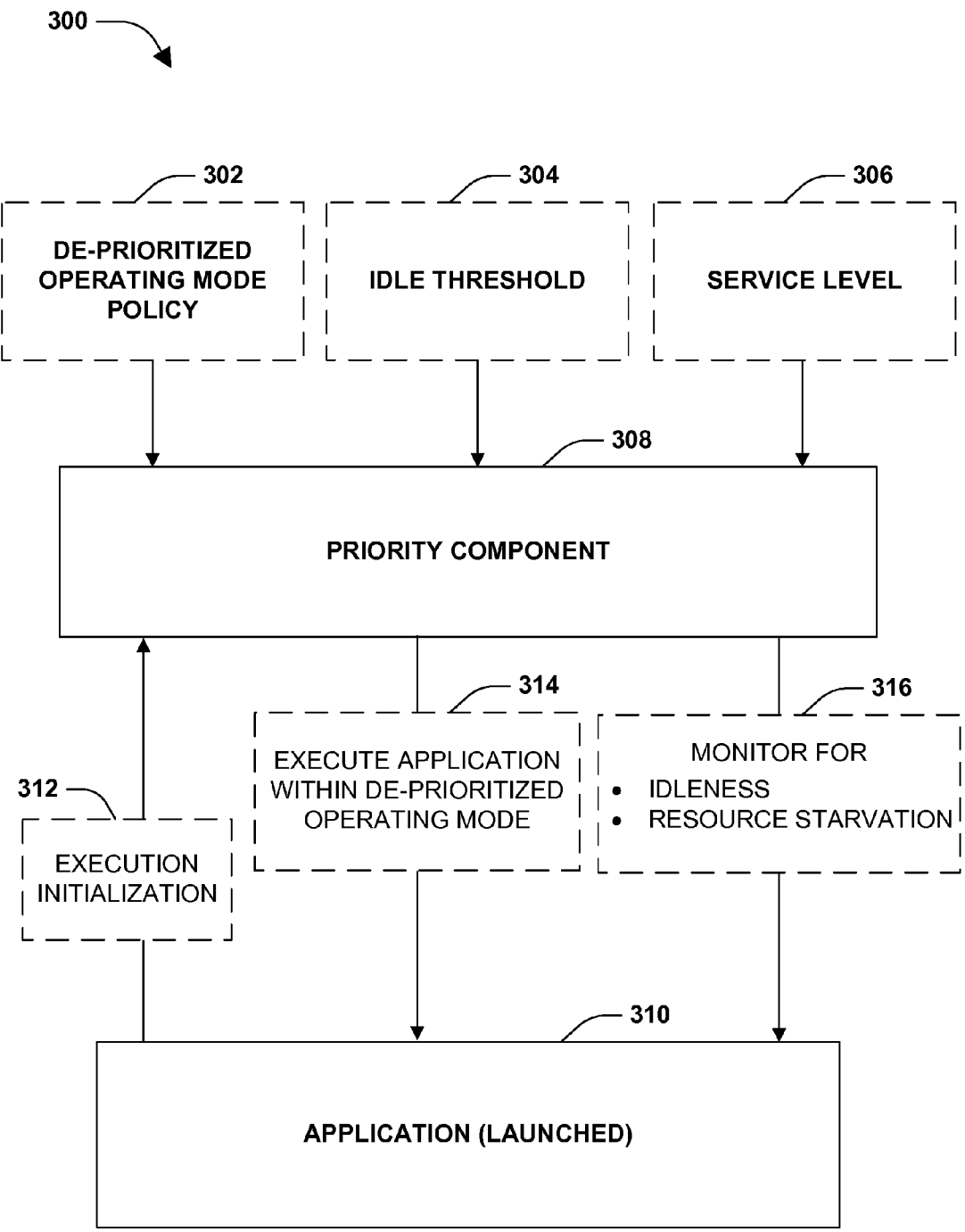
FIG. 3 is a component block diagram illustrating an exemplary system for placing an application into a de-prioritized operating mode during execution.

FIG. 3 illustrates an example of a system 300 configured for placing an application into a de-prioritized operating mode during execution. The system 300 may comprise a priority component 308. The priority component 308 may be configured to place one or more applications, such as application 310, into the de-prioritized operating mode during execution. The de-prioritized operating mode may control access to computing resources by the application 310 based upon a de-prioritized operating mode policy 302. For example, the de-prioritized operating mode policy 302 may comprise CPU scheduling de-prioritization, an I/O access de-prioritization, a memory access de-prioritization, and/or other restrictions/constraints (e.g., network bandwidth constraints, operating system resource constraints, etc.).

In one example, responsive to an execution initialization 312 of the application 310, the priority component 308 may place the application 310 into the de-prioritized operating mode during execution (e.g., execute application 314). In this way, the application 310 may access computing resources based upon the de-prioritized operating mode policy 302. During execution, the priority component 308 may be configured to monitor 316 the application execution of the application 310 based upon an idle threshold 304 and/or a service level 306 associated with resource starvation of the application 310. It may be appreciated that one example of monitoring an application based upon an idle threshold is illustrated in FIG. 5, and that one example of monitoring an application based upon a service level is illustrated in FIG. 6.

Figure 4:
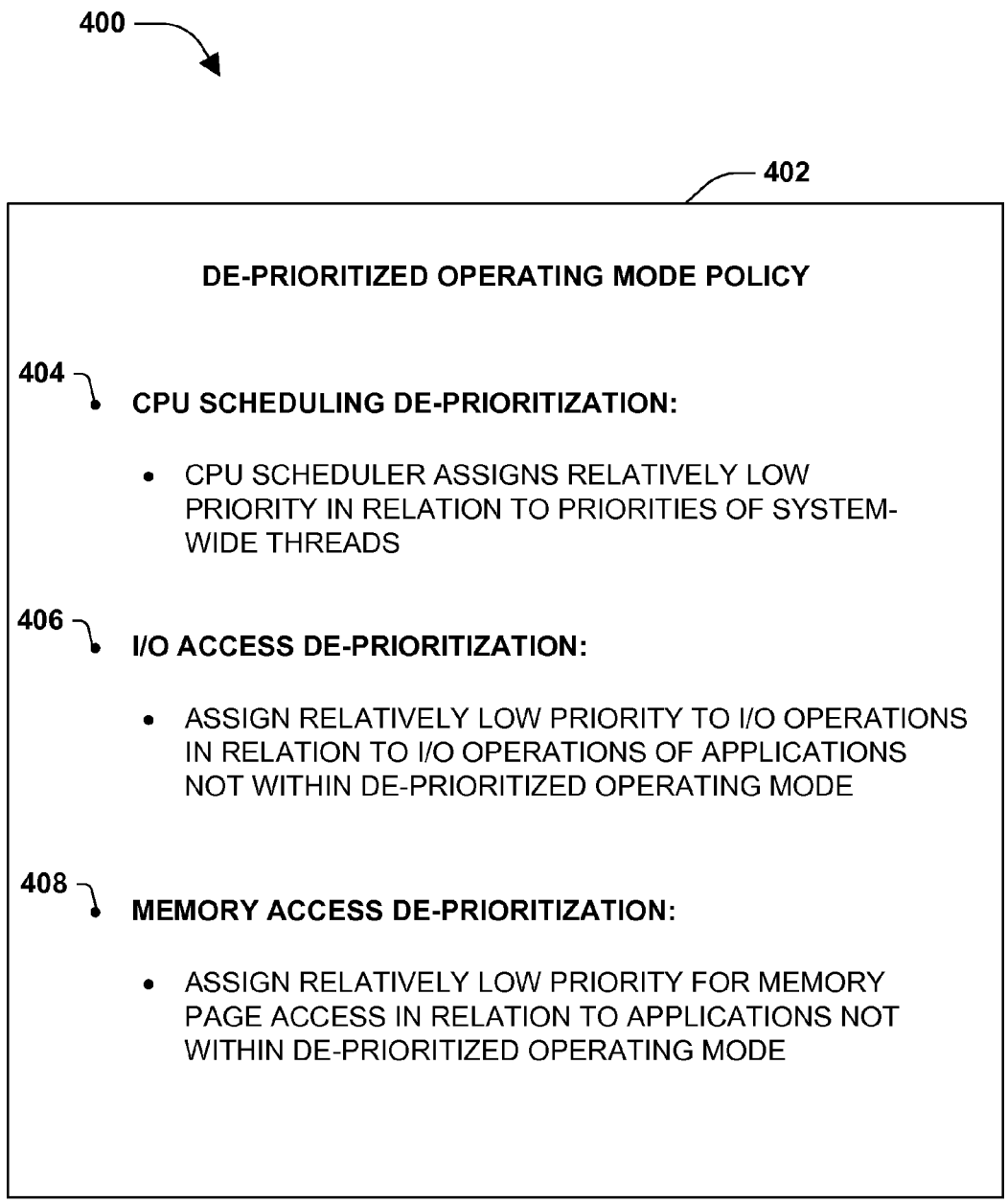
FIG. 4 is an illustration of an example of a de-prioritized operating mode policy.

FIG. 4 illustrates an example 400 of a de-prioritized operating mode policy 402. The de-prioritized operating mode policy 402 may be used by a de-prioritized operating mode to control resource access by an application (e.g., by assigning relatively low priority to the application when competing for access to computing resources, such as CPU cycles, I/O access, memory access, network bandwidth, etc.). In one example, the de-prioritized operating mode policy 402 may comprise a CPU scheduling de-prioritization 404 that may be used by a CPU scheduler to assign a relatively low priority to the application in relation to priorities of system-wide threads (e.g., threads associated with applications placed within a standard operating mode, threads of an operating system, etc.). In this way, when a de-prioritized thread of the application competes for CPU resources, other system-wide threads may gain access to CPU resources over (e.g., before) the de-prioritized thread because of the relatively low priority assigned to the application.

In another example, the de-prioritized operating mode policy 402 may comprise an I/O access de-prioritization 406 that may be used to assign a relatively low priority to I/O operations of the application in relation to I/O operations of other applications not within the de-prioritized operating mode. In this way, I/O operations of the application may wait for I/O operations of the other applications to complete before being processed. In another example, the de-prioritized operating mode policy 402 may comprise a memory access de-prioritization 408, which may be used to assign a relatively low priority for memory page access by the application in relation to applications not within the de-prioritized operating mode. It may be appreciated that the de-prioritized operating mode policy 402 may comprise other restrictions and/or constraints not illustrated.

Figure 5:
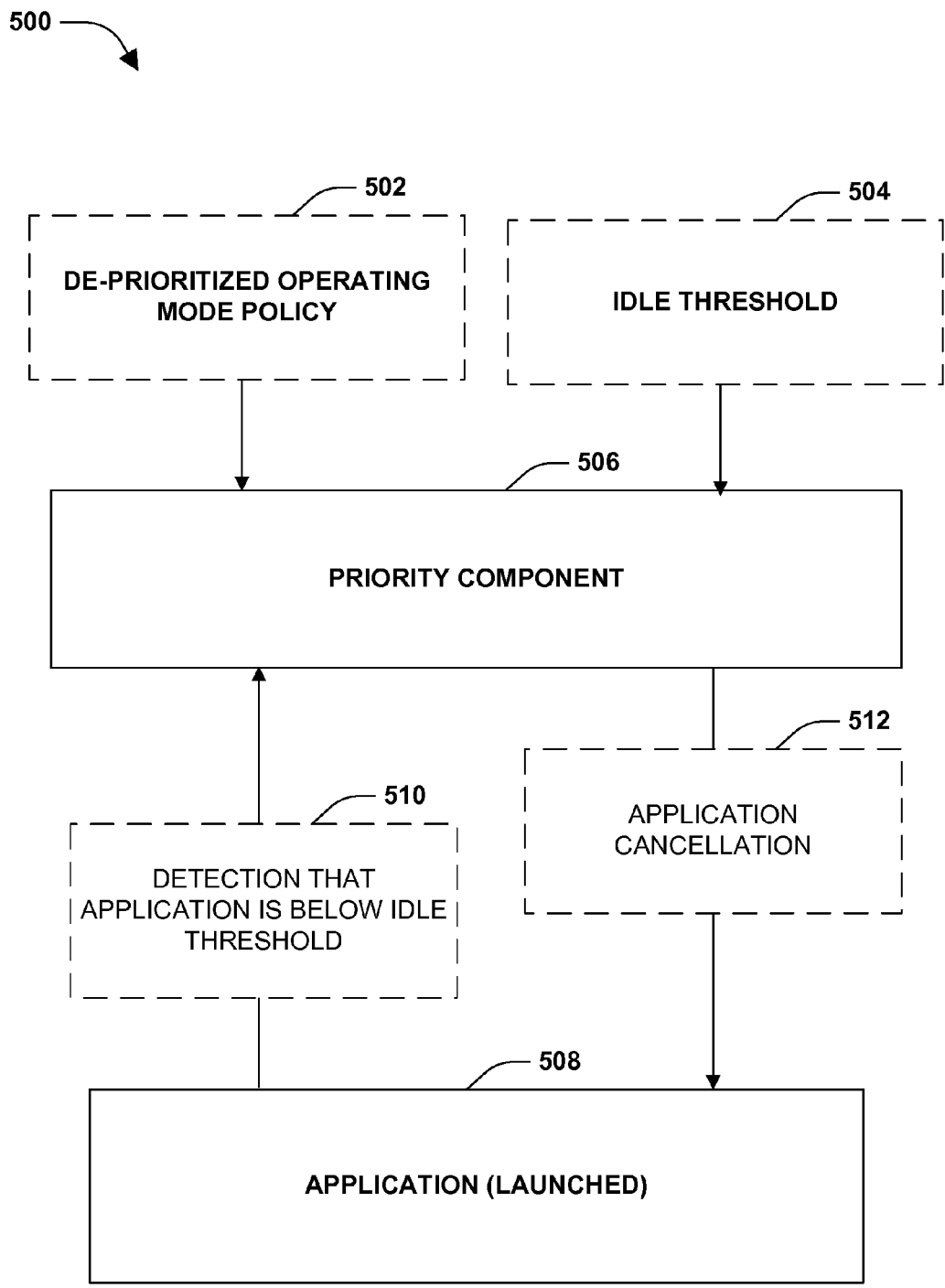
FIG. 5 is a component block diagram illustrating an exemplary system for cancelling an application based upon an idle threshold.
Figure 6:
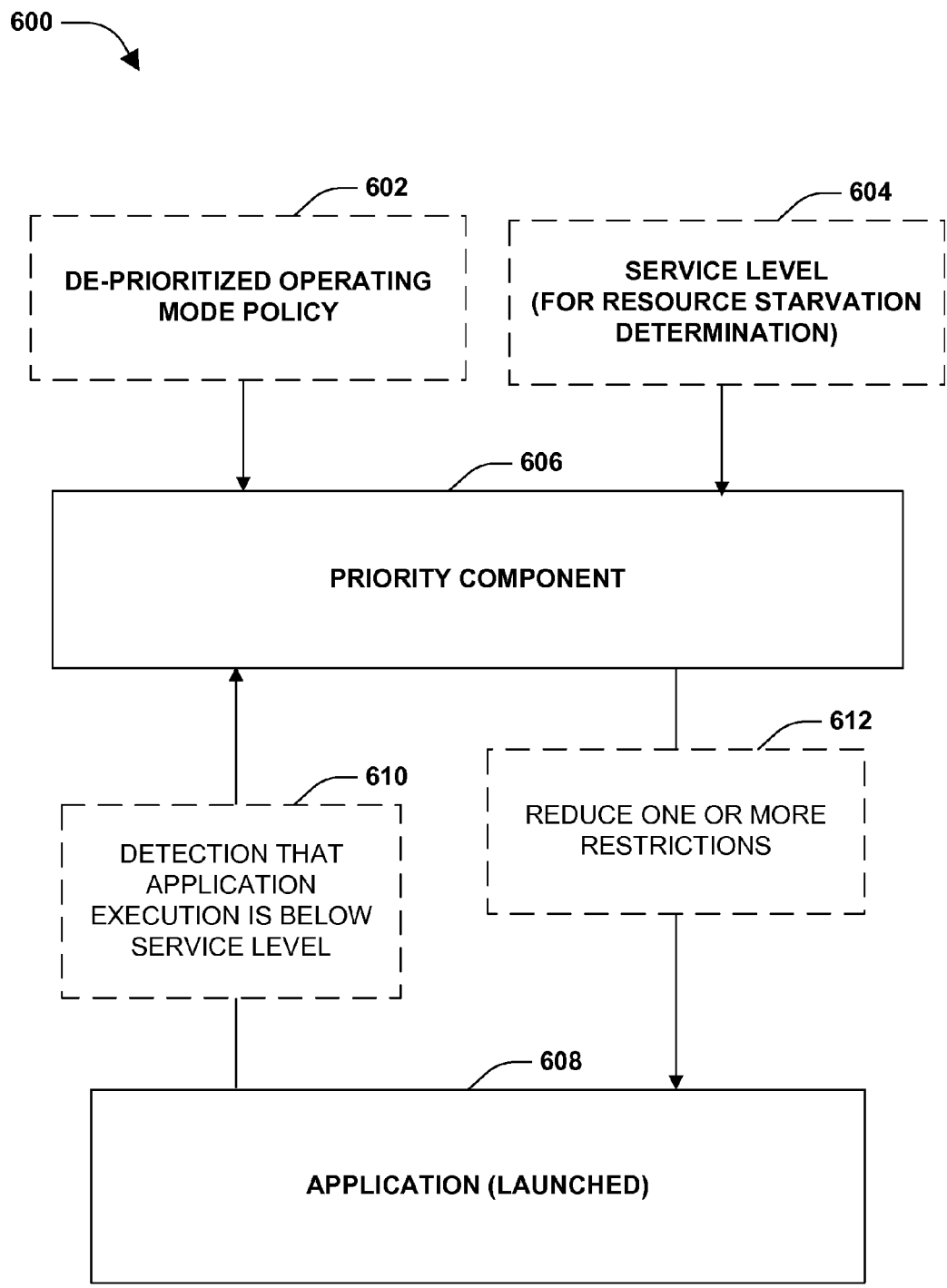
FIG. 6 is a component block diagram illustrating an exemplary system for providing an application with resource access according to a service level for the application.

FIG. 5 illustrates an example of a system 500 configured for cancelling an application based upon an idle threshold 504. The system 500 may comprise a priority component 506. The priority component 506 may place an application 508 into a de-prioritized operating mode during execution. The de-prioritized operating mode may control access to computing resources by the application 508 based upon a de-prioritized operating mode policy 502. During execution of the application 508 within the de-prioritized operating mode, the priority component 506 may be configured to monitor the application 508 based upon the idle threshold 504. In one example, the priority component 506 may detect 510 that the application execution of the application 508 is below the idle threshold 504 (e.g., that the application 508 is not making significant task completion progress, such as by continuously polling a non-responsive server, by continuously executing a loop that does not make forward progress towards task completion, not utilizing adequate resources, etc.). The priority component 506 may facilitate cancellation 512 of the application based upon the application execution of the application 508 being below the idle threshold. In this way, computing resources may become available for other applications, such as foreground applications, for example.

FIG. 6 illustrates an example of a system 600 configured for providing an application with resource access according to a service level 604 for the application. The system 600 may comprise a priority component 606. The priority component 606 may place an application 608 into a de-prioritized operating mode during execution. The de-prioritized operating mode may control access to computing resources by the application 608 based upon a de-prioritized operating mode policy 602 During execution of the application 608 within the de-prioritized operating mode, the priority component 606 may be configured to monitor the application 608 based upon the service level 604 for the application 608. For example, CPU scheduling information, I/O activity, memory access, and/or other information related to execution of the application 608 may be monitored by the priority component 606 to determine whether the application 608 is making forward task progress or whether the application 608 is resource starved (e.g., the application 608 may be unable to access adequate computing resources for forward task progress because of the relatively low priority assigned to the application 608 by the de-prioritized operating mode). In one example, the priority component 606 may detect 610 that the application execution of the application 608 is below the service level 604. The priority component 606 may reduce 612 one or more restrictions (e.g., constraints) placed on the application 608 by the de-prioritized operating mode. In this way, the application 608 may compete for computing resources using a priority that may be relatively similar to priorities of applications not placed within the de-prioritized operating mode, which may allow the application 608 to make forward task progress.

Figure 7:
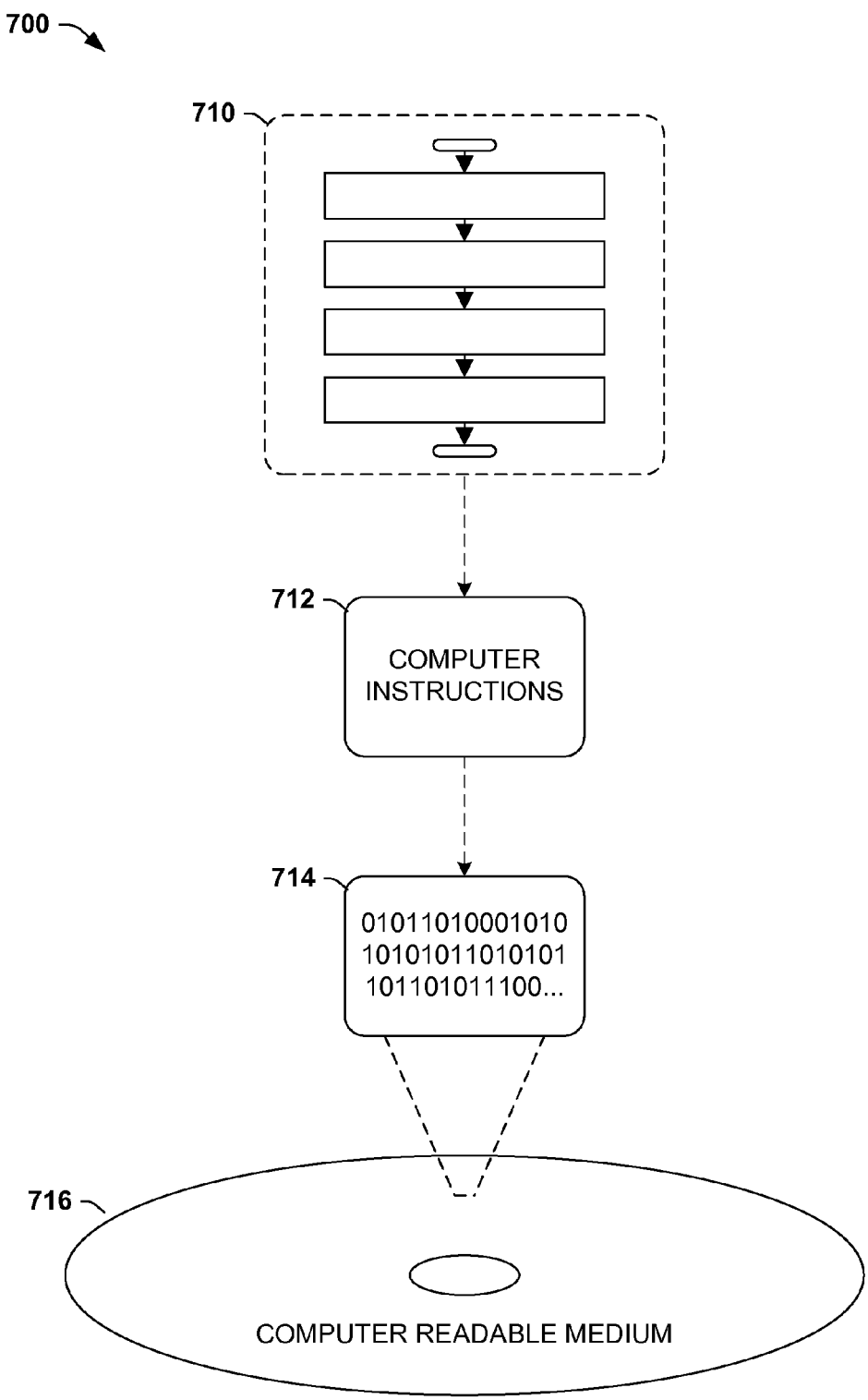
FIG. 7 is an illustration of an exemplary computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 7, wherein the implementation 700 comprises a computer-readable medium 716 (e.g., a CD-R, DVD-R, or a platter of a hard disk drive), on which is encoded computer-readable data 714. This computer-readable data 714 in turn comprises a set of computer instructions 712 configured to operate according to one or more of the principles set forth herein. In one such embodiment 700, the processor-executable computer instructions 712 may be configured to perform a method 710, such as at least some of the exemplary method 100 of FIG. 1, for example. In another such embodiment, the processor-executable instructions 712 may be configured to implement a system, such as, at least some of the exemplary system 200 of FIG. 2, at least some of the exemplary system 300 of FIG. 3, at least some of the exemplary system 500 of FIG. 5, and/or at least some of the exemplary system 600 of FIG. 6, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 8:
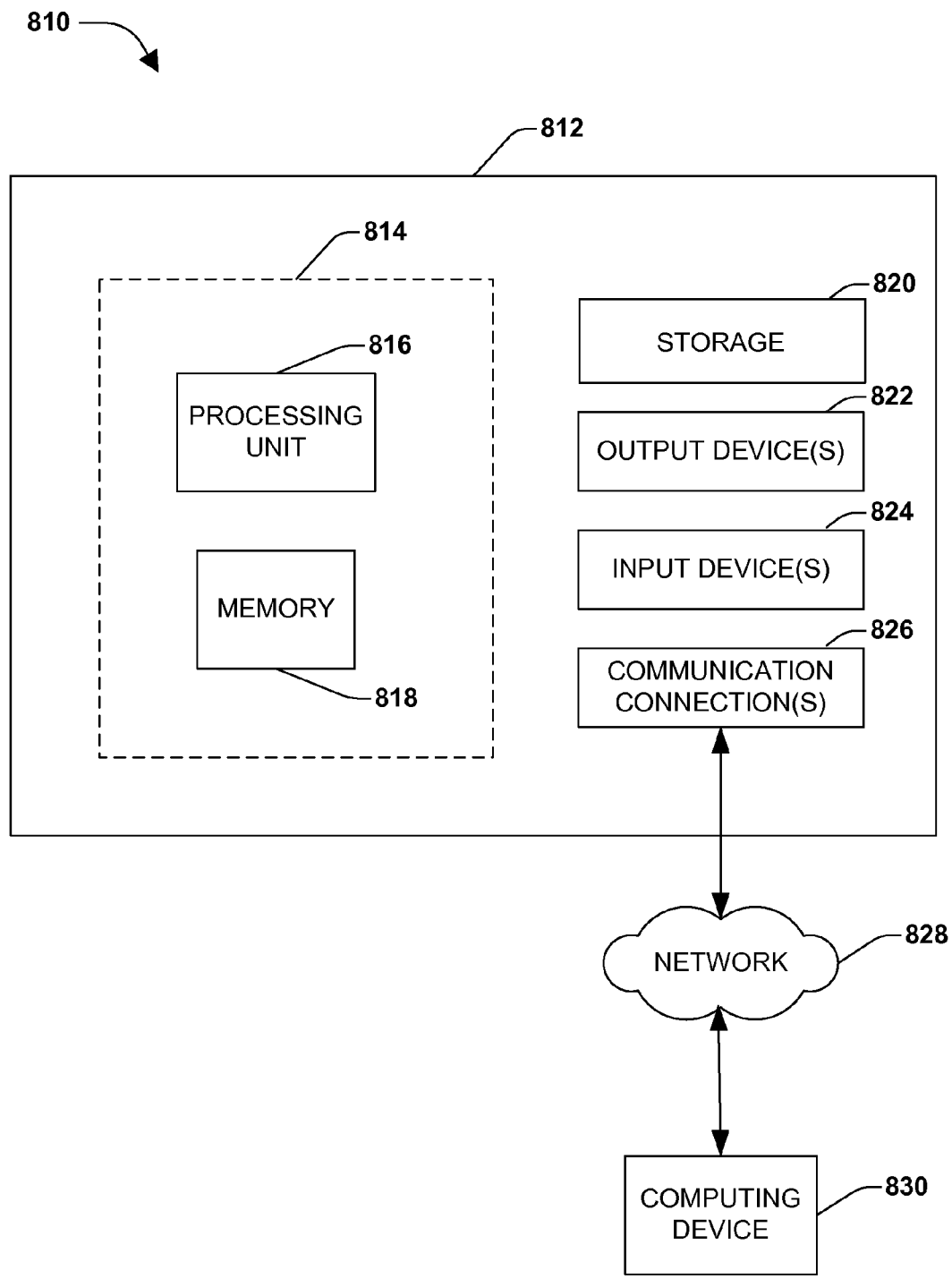
FIG. 8 illustrates an exemplary computing environment wherein one or more of the provisions set forth herein may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 810 comprising a computing device 812 configured to implement one or more embodiments provided herein. In one configuration, computing device 812 includes at least one processing unit 816 and memory 818. Depending on the exact configuration and type of computing device, memory 818 may be volatile (such as RAM, for example), non-volatile (such as ROM, flash memory, etc., for example) or some combination of the two. This configuration is illustrated in FIG. 8 by dashed line 814.

In other embodiments, device 812 may include additional features and/or functionality. For example, device 812 may also include additional storage (e.g., removable and/or non-removable) including, but not limited to, magnetic storage, optical storage, and the like. Such additional storage is illustrated in FIG. 8 by storage 820. In one embodiment, computer readable instructions to implement one or more embodiments provided herein may be in storage 820. Storage 820 may also store other computer readable instructions to implement an operating system, an application program, and the like. Computer readable instructions may be loaded in memory 818 for execution by processing unit 816, for example.

The term "computer readable media" as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 812. Any such computer storage media may be part of device 812.

Device 812 may also include communication connection(s) 826 that allows device 812 to communicate with other devices. Communication connection(s) 826 may include, but is not limited to, a modem, a Network Interface Card (NIC), an integrated network interface, a radio frequency transmitter/receiver, an infrared port, a USB connection, or other interfaces for connecting computing device 812 to other computing devices. Communication connection(s) 826 may include a wired connection or a wireless connection. Communication connection(s) 826 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 812 may include input device(s) 824 such as keyboard, mouse, pen, voice input device, touch input device, infrared cameras, video input devices, and/or any other input device. Output device(s) 822 such as one or more displays, speakers, printers, and/or any other output device may also be included in device 812. Input device(s) 824 and output device(s) 822 may be connected to device 812 via a wired connection, wireless connection, or any combination thereof. In one embodiment, an input device or an output device from another computing device may be used as input device(s) 824 or output device(s) 822 for computing device 812.

Components of computing device 812 may be connected by various interconnects, such as a bus. Such interconnects may include a Peripheral Component Interconnect (PCI), such as PCI Express, a Universal Serial Bus (USB), firewire (IEEE 13104), an optical bus structure, and the like. In another embodiment, components of computing device 812 may be interconnected by a network. For example, memory 818 may be comprised of multiple physical memory units located in different physical locations interconnected by a network.

Those skilled in the art will realize that storage devices utilized to store computer readable instructions may be distributed across a network. For example, a computing device 830 accessible via a network 828 may store computer readable instructions to implement one or more embodiments provided herein. Computing device 812 may access computing device 830 and download a part or all of the computer readable instructions for execution. Alternatively, computing device 812 may download pieces of the computer readable instructions, as needed, or some instructions may be executed at computing device 812 and some at computing device 830.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, at least one of A and B and/or the like generally means A or B or both A and B.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for application prioritization, comprising:
   determining that an application is to be placed within a de-prioritized operating mode;
   initiating a launch of the application within the de-prioritized operating mode;
   in response to initiating the launch of the application within the de-prioritized operating mode, placing a first set of one or more restrictions on the application, wherein the first set of one or more restrictions causes an operation of the application to be restricted according to a determined level;
   monitoring a progress of the launch;
   responsive to determining that the progress of the launch is below a launch progress threshold, reducing the first set of one or more restrictions such that the reduction of the first set of one or more restrictions causes the operation of the application to be less restricted than the determined level, according to a comparatively lower determined level, wherein determining the progress of the launch is below a launch progress threshold includes determining that the application has not fully launched within a predetermined period of time; and
   responsive to the launch of the application, executing the application within the de-prioritized operating mode while the reduced first set of one or more restrictions act to restrict the operation of the application according to the comparatively lower determined level that is less restrictive than the determined level.

2. The method of claim 1, wherein the determination that the application is to be placed within the de-prioritized operating mode comprises:
   identifying the application as a background application.

3. The method of claim 1, wherein the de-prioritized operating mode comprises at least one of:
   a CPU scheduling de-prioritization;
   an I/O access de-prioritization;
   a memory access de-prioritization; or
   GPU scheduling de-prioritization.

4. The method of claim 1, wherein the de-prioritized operating mode comprises:
   an I/O access de-prioritization for one or more I/O operations by the application.

5. The method of claim 1, wherein the de-prioritized operating mode comprises:
   a memory access de-prioritization for memory page access by the application.

6. The method of claim 1, wherein the determination that the progress of the launch is below a launch progress threshold comprises:
   evaluating at least one of the following to determine whether the application has not been provided adequate access to resources to make forward progress with the launch: CPU scheduling information, I/O activity, or memory access.

7. The method of claim 6, wherein the evaluation comprises:
   querying a kernel for at least one of the CPU scheduling information or the I/O activity.

8. The method of claim 1, further comprising:
   responsive to determining that the progress of the launch is no longer below the launch progress threshold, restoring at least some of the first set of one or more restrictions.

9. The method of claim 1, wherein the execution of the application within the de-prioritized operating mode comprises:

responsive to determining that execution of the application is below a specified service level for the application, reducing a second set of one or more restrictions placed upon the application by the de-prioritized operating mode.

10. The method of claim 1, wherein the execution of the application within the de-prioritized operating mode comprises:
responsive to determining that the execution of the application is below an idle threshold, facilitating cancellation of the application.

11. The method of claim 10, wherein the determination that the execution of the application is below an idle threshold comprises:
determining that a device, hosting the application, is configured to perform at least one of the following: enter a lower power state or free up memory if the application is cancelled.

12. The method of claim 1, further comprising:
monitoring the execution of the application based upon a watchdog timer functionality to determine whether the application is idle or resource starved.

13. The method of claim 1, comprising:
responsive to the application being placed into a foreground state, transitioning the application from the de-prioritized operating mode to a standard operating mode.

14. The method of claim 13, comprising:
responsive to the application being transitioned from the foreground state to a background state, transitioning the application from the standard operating mode to the de-prioritized operating mode.

15. The method of claim 1, wherein the determination that the application is to be placed within the de-prioritized operating mode includes determining at least one of:
whether the application is to be executed in a background state; or
whether the application is a service.

16. A computer system, comprising:
one or more processors; and
one or more computer-readable hardware storage devices having stored thereon computer-executable instructions that are executable by the one or more processors to cause the computer system to prioritize an application by causing the computer system to:
determine that an application is to be placed within a de-prioritized operating mode;
initiate a launch of the application within the de-prioritized operating mode;
in response to initiating the launch of the application within the de-prioritized operating mode, place a first set of one or more restrictions on the application, wherein the first set of one or more restrictions causes an operation of the application to be restricted according to a determined level;
monitor a progress of the launch;
responsive to determining that the progress of the launch is below a launch progress threshold, reduce the first set of one or more restrictions such that the reduction of the first set of one or more restrictions causes the operation of the application to be less restricted than the determined level, according to a comparatively lower determined level, wherein determining the progress of the launch is below a launch progress threshold includes determining that the application has not fully launched within a predetermined period of time; and
responsive to the launch of the application, execute the application within the de-prioritized operating mode while the reduced first set of one or more restrictions act to restrict the operation of the application according to the comparatively lower determined level that is less restrictive than the determined level.

17. The computer system of claim 16, wherein the computer-executable instructions further cause the computer system to:
responsive to the application being placed into a foreground state, transition the application from the de-prioritized operating mode to a standard operating mode.

18. The computer system of claim 17, wherein the computer-executable instructions further cause the computer system to:
responsive to the application being transitioned from the foreground state to a background state, transition the application from the standard operating mode to the de-prioritized operating mode.

19. The computer system of claim 18, wherein the computer-executable instructions further cause the computer system to:
monitor the execution of the application based upon a watchdog timer functionality to determine whether the application is idle or resource starved.

20. A computer system, comprising:
one or more processors; and
one or more computer-readable hardware storage devices having stored thereon computer-executable instructions that are executable by the one or more processors to cause the computer system to prioritize an application by causing the computer system to perform at least the following:
determine that an application is to be placed within a de-prioritized operating mode;
initiate a launch of the application within the de-prioritized operating mode;
monitor a progress of the launch;
responsive to a determination that the progress of the launch is below a launch progress threshold, reduce a first set of one or more restrictions placed upon the application by the de-prioritized operating mode, wherein the determination that the progress of the launch is below the launch progress threshold includes a determination that the application has not fully launched within a predetermined period of time;
responsive to the launch of the application, execute the application within the de-prioritized operating mode;
responsive to the application being placed into a foreground state, transition the application from the de-prioritized operating mode to a standard operating mode;
responsive to the application being transitioned from the foreground state to a background state, transition the application from the standard operating mode back to the de-prioritized mode; and
determine that a device, hosting the application, is configured to at least perform one of the following: enter a low power state or free up memory if the application is cancelled.

* * * * *